US012332668B2

(12) United States Patent
Suda et al.

(10) Patent No.: US 12,332,668 B2
(45) Date of Patent: Jun. 17, 2025

(54) REMOTE SUPPORT SYSTEM AND REMOTE SUPPORT METHOD

(71) Applicant: TOYOTA JIDOSHA KABUSHIKI KAISHA, Toyota (JP)

(72) Inventors: Rio Suda, Toyota (JP); Hirofumi Momose, Numazu (JP); Junji Kawamuro, Susono (JP); Shuichi Tamagawa, Kitanagoya (JP); Kosuke Akatsuka, Mishima (JP); Yuki Suehiro, Susono (JP); Naofumi Kobayashi, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 12 days.

(21) Appl. No.: 18/396,127

(22) Filed: Dec. 26, 2023

(65) Prior Publication Data

US 2024/0248493 A1   Jul. 25, 2024

(30) Foreign Application Priority Data

Jan. 25, 2023  (JP) ................ 2023-009586

(51) Int. Cl.
*G05D 1/22* (2024.01)
*G05D 1/224* (2024.01)
*G05D 1/80* (2024.01)
*G05D 109/10* (2024.01)

(52) U.S. Cl.
CPC ............. *G05D 1/80* (2024.01); *G05D 1/2248* (2024.01); *G05D 2109/10* (2024.01)

(58) Field of Classification Search
CPC ..... G05D 1/80; G05D 1/2248; G05D 2109/10
See application file for complete search history.

(56) References Cited

U.S. PATENT DOCUMENTS

| | | | |
|---|---|---|---|
| 10,930,155 B2 | 2/2021 | Swan | |
| 11,215,982 B2 | 1/2022 | Urano et al. | |
| 11,325,618 B2 | 5/2022 | Umeda | |
| 2011/0063445 A1 | 3/2011 | Chew | |
| 2019/0137999 A1 | 5/2019 | Taguchi et al. | |
| 2020/0209888 A1 | 7/2020 | Sakai et al. | |
| 2020/0326702 A1 | 10/2020 | Iwamoto et al. | |
| 2021/0041894 A1 | 2/2021 | Urano et al. | |
| 2021/0055741 A1 | 2/2021 | Kawanai et al. | |

(Continued)

OTHER PUBLICATIONS

Kaiming He et al., "Deep Residual Learning for Image Recognition," arXiv:1512. 03385v, Dec. 10, 2015, 12 pages.

(Continued)

*Primary Examiner* — Mathew Franklin Gordon
(74) *Attorney, Agent, or Firm* — Sughrue Mion, PLLC

(57) ABSTRACT

A remote support system performs a remote support of a moving body. The remote support system includes processing circuitry. The processing circuitry is configured to acquire, via communication, a first video shot with a first infrastructure camera installed in a target area in which the moving body moves. The processing circuitry is configured to present the first video to a remote supporter to perform the remote support for the moving body. When an abnormality occurs in the first video, the processing circuitry is configured to execute an abnormality handling process to resolve the abnormality in the first video or to present a substitute video to the remote supporter instead of the first video.

11 Claims, 10 Drawing Sheets

1: REMOTE SUPPORT SYSTEM

(56) References Cited

U.S. PATENT DOCUMENTS

2021/0058173 A1  2/2021  Otaki et al.
2021/0072743 A1  3/2021  Otaki
2021/0080943 A1  3/2021  Iwamoto et al.
2021/0089018 A1  3/2021  Nordbruch et al.

OTHER PUBLICATIONS

Mfan Jiang et al., "EnlightenGAN: Deep Light Enhancement without Paired Supervision", arXiv:1906.06972v1, Jun. 17, 2019, 11 pages.

REMOTE SUPPORT SYSTEM AND REMOTE SUPPORT METHOD

CROSS-REFERENCES TO RELATED APPLICATION

This application claims priority to Japanese Patent Application No. 2023-009586 filed on Jan. 25, 2023, the entire contents of which are incorporated by reference herein.

TECHNICAL FIELD

The present disclosure relates to a technique for a remote support for a moving body by using an infrastructure camera.

BACKGROUND ART

Patent Literature 1 discloses a technique for remotely controlling a vehicle.

Non-Patent Literature 1 discloses an image recognition technique using ResNet (Deep Residual Net).

Non-Patent Literature 2 discloses a technique (EnlightenGAN) for converting a low-illuminance image into a normal-light image by using deep learning. Thus, for example, an image captured in a scene such as nighttime or backlight can be corrected to have appropriate brightness.

LIST OF RELATED ART

Patent Literature 1: U.S. patent Application Publication No. 2021/0089018

Non-Patent Literature 1: Kaiming He, Xiangyu Zhang, Shaoqing Ren, and Jian Sun, "Deep Residual Learning for Image Recognition", arXiv: 1512. 03385v1 [cs. CV], Dec. 10, 2015 (https://arxiv.org/pdf/1512.03385.pdf)

Non-Patent Literature 2: Yifan Jiang, Xinyu Gong, Ding Liu, Yu Cheng, Chen Fang, Xiaohui Shen, Jianchao Yang, Pan Zhou, and Zhangyang Wang, "EnlightenGAN: Deep Light Enhancement without Paired Supervision", arXiv: 1906. 06972v1 [cs. CV], Jun. 17, 2019 (https://arxiv.org/pdf/1906.06972.pdf)

SUMMARY

A remote support (remote monitoring, remote assistance, remote driving) for a moving body by a remote supporter will be considered. In general, a camera mounted on the moving body shoots a video of a situation around the moving body, and the video is presented to the remote supporter. The remote supporter recognizes the surrounding situation of the moving body by viewing the presented video and performs the remote support for the moving body.

In addition to the camera mounted on the moving body, it is also conceivable to use an infrastructure camera for the remote support. In this case, the infrastructure camera shoots a video of the moving body and its surroundings and the video showing the moving body as well is presented to the remote supporter. This is considered to further improve accuracy of the remote support. However, when an abnormality occurs in the video presented to the remote supporter, an effect of improving the accuracy of the remote support cannot be sufficiently obtained.

An object of the present disclosure is to provide a technique capable of ensuring accuracy of a remote support of a moving body using an infrastructure camera.

A first aspect relates to a remote support system for performing a remote support of a moving body.

The remote support system includes processing circuitry.

The processing circuitry is configured to acquire, via communication, a first video shot with a first infrastructure camera installed in a target area in which the moving body moves.

The processing circuitry is configured to present the first video to a remote supporter to perform the remote support for the moving body.

When an abnormality occurs in the first video, the processing circuitry is configured to execute an abnormality handling process to resolve the abnormality in the first video or to present a substitute video to the remote supporter instead of the first video.

A second aspect relates to a remote support method executed by a computer and for performing a remote support for a moving body.

The remote support method includes:
acquiring, via communication, a first video shot with a first infrastructure camera installed in a target area in which the moving body moves;
presenting the first video to a remote supporter to perform the remote support for the moving body; and
when an abnormality in the first video occurs, executing an abnormality handling process to resolve the abnormality in the first video or to present a substitute video to the remote supporter instead of the first video.

According to the present disclosure, the first video shot with the first infrastructure camera is presented to the remote supporter. When an abnormality occurs in the first video, the abnormality handling process is executed. The abnormality handling process resolves the abnormality of the first video or presents a substitute video to the remote supporter instead of the first video. The remote supporter can continue the remote support by referring to the first video whose abnormality is resolved or the substitute video. This ensures accuracy of the remote support.

DETAILED DESCRIPTION

Embodiments of the present disclosure will be described with reference to the accompanying drawings.

1. Remote Support System

A remote support for a moving body will be considered. The remote support is a concept including remote monitoring, remote assistance, and remote driving. Examples of the moving body include a vehicle, a robot, etc. The vehicle may be driven by an autonomous driving system or by a driver. As an example of the robot, a distribution robot is exemplified. In the following description, a case where the moving body which is a target of the remote support is a vehicle will be considered as an example. In the case of generalization, "vehicle" in the following description can be replaced with "moving body".

Figure 1:
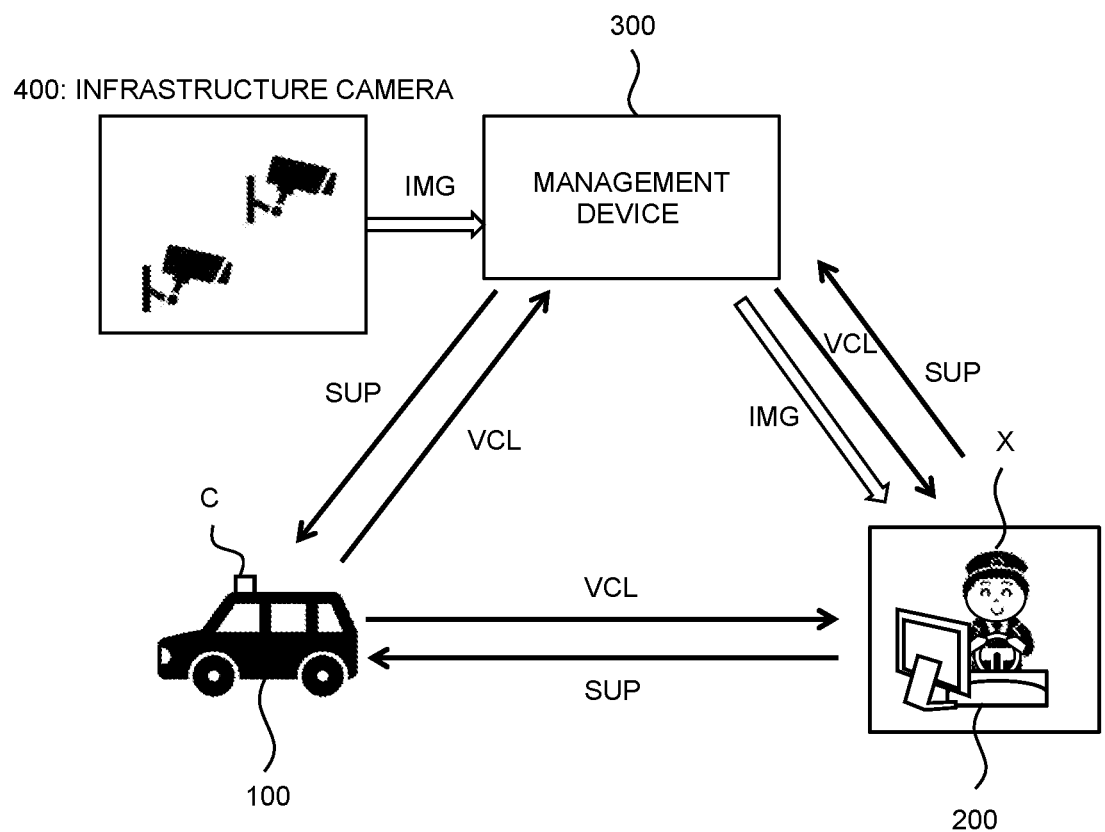
FIG. 1 is a schematic diagram showing a configuration example of a remote support system according to an embodiment.

FIG. 1 is a schematic diagram showing an example of a configuration of a remote support system 1 according to the embodiment. The remote support system 1 includes a vehicle 100, a remote support terminal 200, and a management device 300. The vehicle 100 is a target of the remote support by a remote supporter X. The remote support terminal 200 is operated by the remote supporter X to perform the remote support for the vehicle 100. The remote support terminal 200 may also be referred to as a remote cockpit. The management device 300 manages the remote support system 1. Typically, the management device 300 is a management server on a cloud. The management device 300 may be configured by a plurality of servers that perform distributing processing.

The vehicle 100, the remote support terminal 200, and the management device 300 can communicate with each other via a communication network. The vehicle 100 and the remote support terminal 200 can communicate with each other via the management device 300. The vehicle 100 and the remote support terminal 200 may directly communicate with each other without via the management device 300.

The driver or the autonomous driving system of the vehicle 100 requests the remote support as necessary. For example, when the vehicle 100 falls into a situation in which autonomous driving is difficult, the autonomous driving system requests the remote support. The vehicle 100 sends a remote support request to the management device 300. The remote support request may be a remote assistance request (RFI: Request for Information) or a remote driving request (RFO: Request for Operation). In response to the remote support request, the management device 300 allocates a certain remote supporter X from among a plurality of candidates to the vehicle 100 that is the target of the remote support. The management device 300 manages an allocation relationship between the vehicle 100 and the remote supporter X and provides information on the allocation relationship to the vehicle 100 and the remote support terminal 200. Based on the information of the allocation relationship, the vehicle 100 and the remote support terminal 200 establish communication. After the communication is established, the vehicle 100 and the remote support terminal 200 may directly communicate with each other without via the management device 300.

Various sensors, including an in-vehicle camera C, are mounted on the vehicle 100. The in-vehicle camera C images the surroundings of the vehicle 100 and acquires a video (image) showing a situation around the vehicle 100. Vehicle information VCL is information obtained by the various sensors, and includes the video obtained by the in-vehicle camera C. The vehicle 100 transmits the vehicle information VCL to the remote support terminal 200.

The remote support terminal 200 receives the vehicle information VCL transmitted from the vehicle 100. The remote support terminal 200 presents the vehicle information VCL to the remote supporter X. Specifically, the remote support terminal 200 includes a display device and displays the video and the like on the display device. The remote supporter X recognizes the situation around the vehicle 100 by viewing the displayed information and performs the remote support for the vehicle 100. Remote support information SUP is information related to the remote support by the remote supporter X. For example, the remote support information SUP includes an instruction or an operation amount input by the remote supporter X. The remote support terminal 200 transmits the remote support information SUP to the vehicle 100 as necessary.

The vehicle 100 receives the remote support information SUP transmitted from the remote support terminal 200. The vehicle 100 performs vehicle travel control in accordance with the received remote support information SUP.

In the present embodiment, the remote support system 1 further includes at least one infrastructure camera 400. The infrastructure camera 400 is installed in a target area where the vehicle 100 moves. The target area is not particularly limited, and the examples include a town, a parking lot, a factory site, etc. The infrastructure camera 400 images the target area and acquires (shoots) a video IMG showing the situation of the target area. In particular, the infrastructure camera 400 is installed at a position and an orientation so as to be able to shoot the vehicle 100 traveling in the target area. Therefore, the vehicle 100, which is the target of the remote support, may be shown in the video IMG shot with the infrastructure camera 400. The infrastructure camera 400 transmits the video IMG to the management device 300.

The management device 300 communicates with the infrastructure camera 400. The management device 300 collects and manages the video IMG shot with the infrastructure camera 400. The management device 300 transmits the video IMG shot with the infrastructure camera 400 to the remote support terminal 200.

The remote support terminal 200 acquires the video IMG shot with the infrastructure camera 400 in addition to the video shot with the in-vehicle camera C, and presents the videos to the remote supporter X. The video IMG shot with the infrastructure camera 400 may show the vehicle 100 which is the target of the remote support. By presenting the video IMG to the remote supporter X, the accuracy of the remote support and the convenience for the remote supporter X are expected to be further improved.

As an application example, a scene in which an autonomous driving vehicle travels in a factory site will be considered. For example, the autonomous driving vehicle assembled in an assembly factory autonomously travels from the assembly factory to a yard. One or more infrastructure cameras 400 are installed on roads from the assembly factory to the yard. With the infrastructure camera 400, the autonomous driving vehicle that is automatically traveling can be remotely monitored. In addition, when the autonomous driving vehicle falls into a situation in which autonomous traveling is difficult, the infrastructure camera 400 can be used to remotely drive the autonomous driving vehicle. When the autonomous driving vehicle falls into a situation in which autonomous traveling is difficult, it is conceivable to send a staff to the site and take over manual driving, but this procedure takes time and labor. It is more convenient to perform remote driving by using the infrastructure camera 400. It is also time and labor saving.

2. Abnormality Determination Process and Abnormality Handling Process

As described above, the video IMG shot with (taken by) the infrastructure camera 400 is presented to the remote supporter X. However, when an abnormality occurs in the video IMG presented to the remote supporter X, the effect of improving the accuracy of the remote support cannot be sufficiently obtained. In view of the above, the remote support system 1 according to the present embodiment is configured to execute an "abnormality determination process" and an "abnormality handling process" described below.

2-1. Abnormality Determination Process

Figure 2:
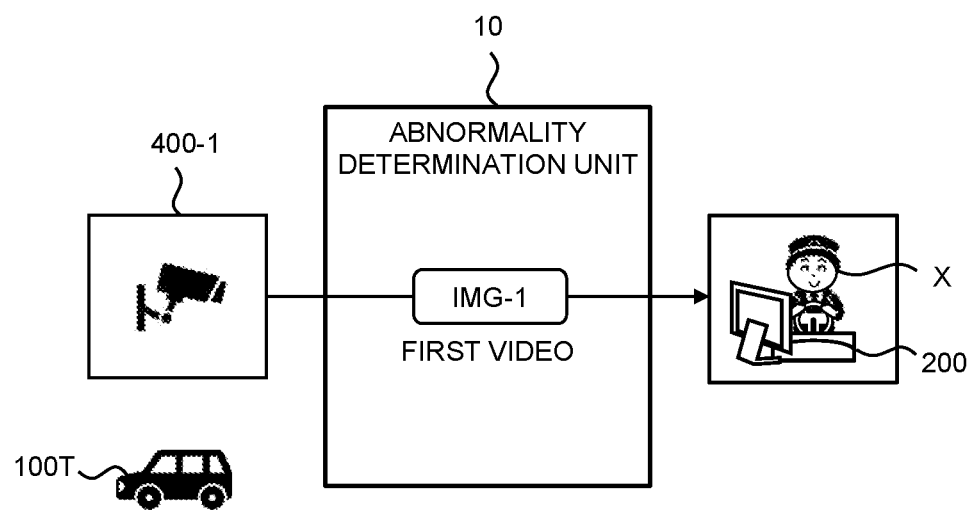
FIG. 2 is a conceptual diagram for explaining an abnormality determination process in the remote support system according to the embodiment.

FIG. 2 is a conceptual diagram for explaining the abnormality determination process in the remote support system 1. The remote support system 1 includes an abnormality determination unit 10. Here, a case where a first video IMG-1 shot with (taken by) a first infrastructure camera 400-1 is presented to the remote supporter X will be considered. The first video IMG-1 may show a target vehicle 100T which is a target of the remote support. Alternatively, the target vehicle 100T may not be shown in the first video IMG-1 at present, but may be shown in the first video IMG-1 in the future. The abnormality determination unit 10 determines whether an abnormality has occurred in the first video IMG-1 presented to the remote supporter X. Various causes of the abnormality in the first video IMG-1 presented to the remote supporter X are considered.

2-1-1. First Abnormality Caused by Communication Quality

A first cause of the abnormality in the first video IMG-1 is a decrease in communication quality in a communication path of the first video IMG-1. The first infrastructure camera 400-1 transmits the first video IMG-1 to the management device 300, and the management device 300 transmits the first video IMG-1 to the remote support terminal 200. The communication qualities (e.g., communication speed, communication delay) of such communication paths may be degraded. For example, when the communication speed is reduced, the first video IMG-1 presented to the remote supporter X may be delayed or frozen. As another example, when the communication is interrupted, the first video IMG-1 does not reach the remote support terminal 200 and is not presented to the remote supporter X. In this way, when the communication quality in the communication path of the first video IMG-1 is deteriorated, the quality of the first video IMG-1 presented to the remote supporter X is also deteriorated. Such the abnormality in the first video IMG-1 caused by the deterioration of the communication quality in the communication path of the first video IMG-1 is hereinafter referred to as a "first abnormality".

The abnormality determination unit 10 receives the first video IMG-1 and monitors the communication qualities (e.g., communication speed and communication delay) in the communication path based on a reception state. Then, the abnormality determination unit 10 determines whether the first abnormality has occurred based on the communication quality in the communication path. For example, when the communication quality in the communication path becomes lower than a first threshold, the abnormality determination unit 10 determines that the first abnormality has occurred.

2-1-2. Second Abnormality Caused by Congestion Control

A second cause of the abnormality in the first video IMG-1 is congestion control on a transmission side (the first infrastructure camera 400-1, the management device 300) of the first video IMG-1. When the communication speed is reduced, the transmission side may actively perform the congestion control in order to avoid communication disruption. In the congestion control, the transmission side reduces resolution or a frame rate of the first video IMG-1 to be transmitted, and thus reduces the quality of the first video IMG-1. As a result, the quality (the resolution, the frame rate) of the first video IMG-1 presented to the remote supporter X is degraded. Such the abnormality in the first video IMG-1 caused by the congestion control on the transmission side is hereinafter referred to as a "second abnormality".

The abnormality determination unit 10 receives the first video IMG-1 and determines whether the congestion control is performed on the transmission side based on the first video IMG-1. When the congestion control is performed, a reception bit rate of the first video IMG-1 may be significantly reduced. Therefore, the abnormality determination unit 10 can determine whether the congestion control is being performed based on a variation in the reception bit rate of the first video IMG-1. For example, a resolution when the congestion control is not performed is a first resolution. On the other hand, a resolution when the congestion control is performed is a second resolution that is lower than the first resolution. The second resolution is specified in advance. A first bit rate is a bit rate corresponding to the first resolution. A second bit rate is a bit rate corresponding to the second resolution. A difference between the first bit rate and the second bit rate is significantly larger than a fluctuation range of the bit rate that is not related to the congestion control. Therefore, the abnormality determination unit 10 compares the reception bit rate of the first video IMG-1 with an average value of the first bit rate and the second bit rate. When the reception bit rate becomes lower than the average value of the first bit rate and the second bit rate, the abnormality determination unit 10 determines that the congestion control is being performed. When it is determined that the congestion control is being performed, the abnormality determination unit 10 determines that the second abnormality has occurred.

2-1-3. Third Abnormality Caused by Photographing Condition

A third cause of the abnormality in the first video IMG-1 is a photographing condition under which the first infrastructure camera 400-1 shoots the first video IMG-1. For example, in a backlight condition etc., so-called "blown out highlights" or "blocked up shadows" may occur in the first video IMG-1. As another example, the first video IMG-1 may be dark in a dark condition. As a result, the quality (visibility) of the first video IMG-1 presented to the remote supporter X is degraded. Such the abnormality in the first video IMG-1 caused by the photographing condition of the first video IMG-1 is hereinafter referred to as a "third abnormality".

The abnormality determination unit 10 receives the first video IMG-1 and automatically determines, based on the first video IMG-1, a condition (scene) under which the first video IMG-1 is shot. As a technique for determining the photographing condition based on the video (image), the technique described in the above-mentioned Non-Patent Literature 1 is exemplified. When it is determined that the first video IMG-1 is shot in the backlight condition or the dark condition, the abnormality determination unit 10 determines that the third abnormality has occurred.

2-1-4. Fourth Abnormality Caused by Camera Abnormality

A fourth cause of the abnormality in the first video IMG-1 is the abnormality of the first infrastructure camera 400-1 itself. For example, when the first infrastructure camera 400-1 fails, the first video IMG-1 is not acquired and is not presented to the remote supporter X. As another example, when an axial deviation of the first infrastructure camera 400-1 occurs and its visual field changes, the target vehicle 100T may not be successfully captured in the visual field. Hereinafter, the abnormality in the first video IMG-1 caused by the abnormality of the first infrastructure camera 400-1 itself is referred to as a "fourth abnormality".

For example, each infrastructure camera 400 has a self-diagnosis function. The first infrastructure camera 400-1 can detect its own abnormality (failure, axial deviation) by the self-diagnosis function. As another example, the first infrastructure camera 400-1 may recognize a predetermined marker placed at a predetermined position within the visual field and detect the axial deviation based on the result of the recognition. The first infrastructure camera 400-1 notifies the abnormality determination unit 10 of the abnormality detection. The abnormality determination unit 10 determines whether the fourth abnormality has occurred based on a presence or absence of the notification.

2-2. Abnormality Handling Process

Figure 3:
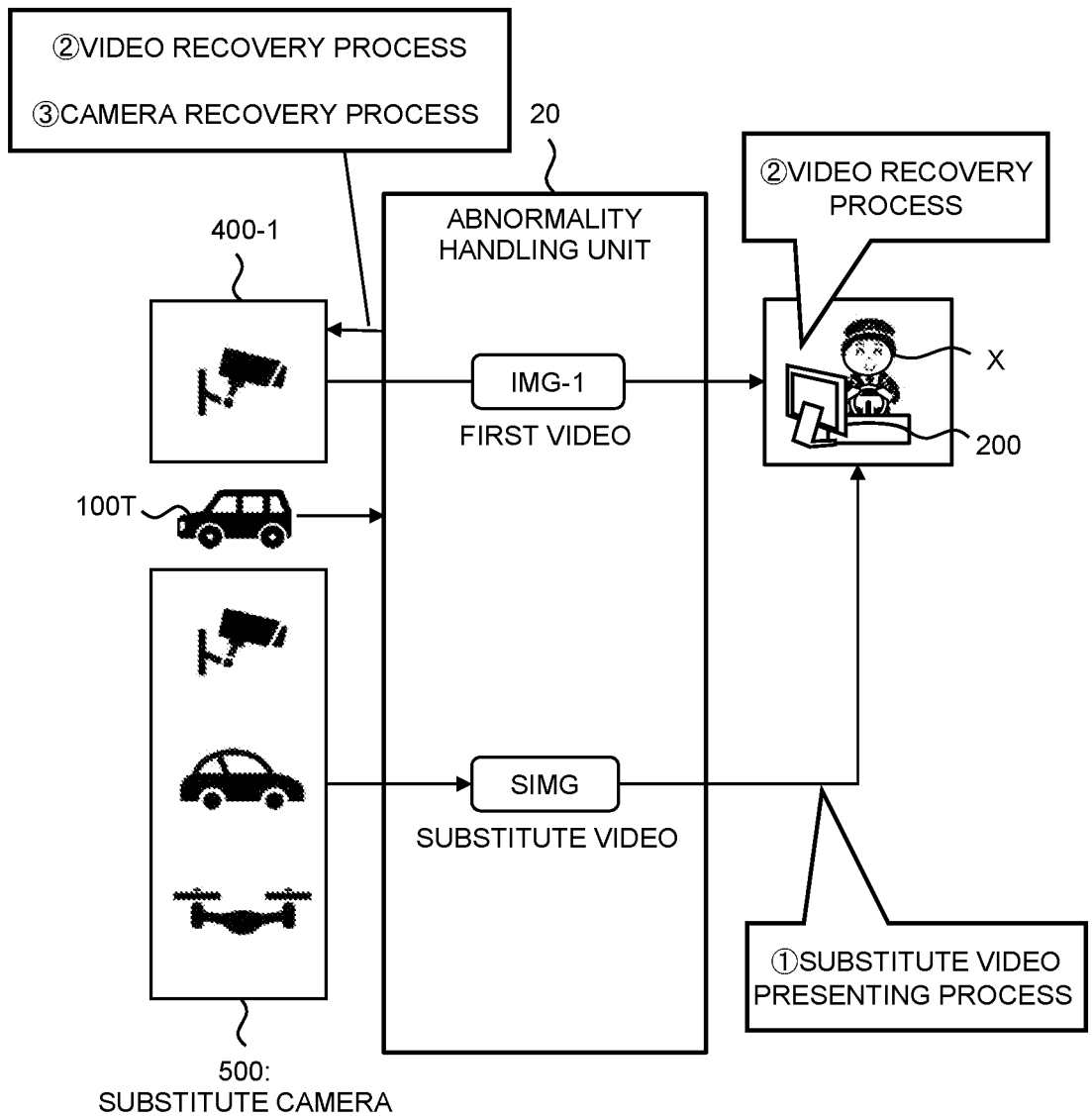
FIG. 3 is a conceptual diagram for explaining an abnormality handling process in the remote support system according to the embodiment.

FIG. 3 is a conceptual diagram for explaining the abnormality handling process in the remote support system 1. The remote support system 1 includes an abnormality handling unit 20. When the above-described abnormality determination unit 10 determines that an abnormality has occurred in the first video IMG-1, the abnormality handling unit 20 performs the abnormality handling process in response to the determination. Various examples of the abnormality handling process are conceivable.

In FIG. 3, a "substitute video presenting process", a "video recovery process", and a "camera recovery process" are exemplified as the abnormality handling process. In the substitute video presenting process, a substitute video SIMG that is to be used instead of the first video IMG-1 is presented to the remote supporter X. The video recovery process resolves the abnormality of the first video IMG-1 by recovering the quality of the first video IMG-1. The camera recovery process resolves the abnormality of the first video IMG-1 by repairing the abnormality of the first infrastructure camera 400-1. The abnormality handling unit 20 may perform the abnormality handling process according to the type of abnormality of the first video IMG-1. The details of each abnormality handling process will be described below.

2-2-1. Substitute Video Presenting Process

Figure 4:
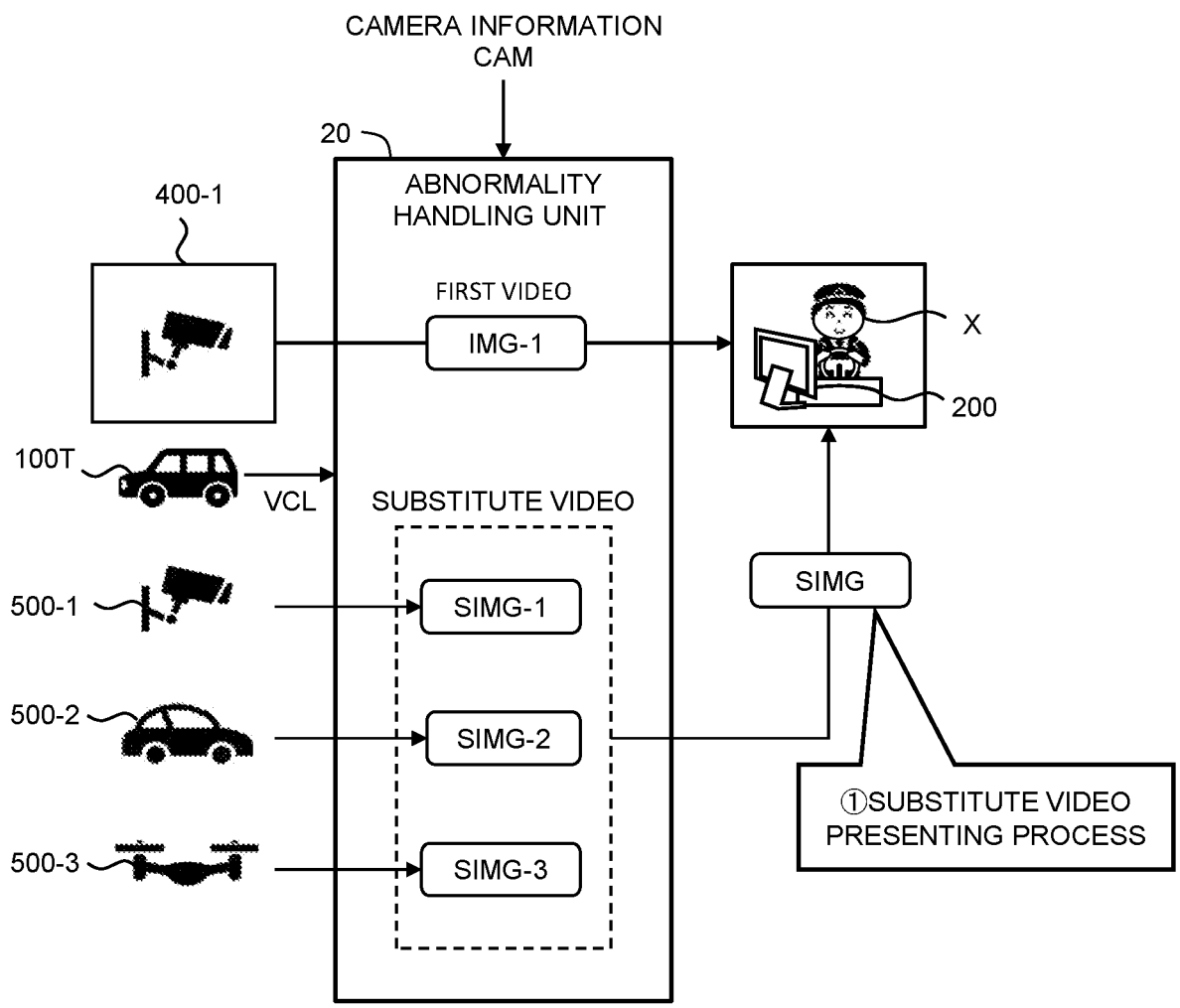
FIG. 4 is a conceptual diagram for explaining processing related to a substitute video presenting process according to the embodiment.

FIG. 4 is a conceptual diagram for explaining processing related to the substitute video presenting process. In the substitute video presenting process, a substitute camera 500 capable of shooting the target area is utilized instead of the first infrastructure camera 400-1.

For example, the substitute camera 500 is another infrastructure camera 400 different from the first infrastructure camera 400-1. As another example, the substitute camera 500 is a camera mounted on a moving body different from the target vehicle 100T that is the target of the remote support. The moving body may be a vehicle or a flying object (e.g., drone). Typically, the different moving body is located around the target vehicle 100T, and the camera shoots the target vehicle 100T and its surroundings. For example, the different moving body is a following vehicle that travels behind the target vehicle 100T. As another example, the different moving body may be a flying object located above the target vehicle 100T.

The abnormality handling unit 20 acquires the substitute video SIMG shot with (taken by) the substitute camera 500. The target vehicle 100T, which is the target of the remote support, may be shown in the substitute video SIMG. Alternatively, the target vehicle 100T may not be shown in the substitute video SIMG at present, but may be shown in the substitute video SIMG in the future. Then, the abnormality handling unit 20 presents the substitute video SIMG to the remote supporter X instead of the first video IMG-1. The remote supporter X is able to continue the remote support by referring to the substitute video SIMG with no abnormality instead of the first video IMG-1 in which the abnormality has occurred. This ensures the accuracy of the remote support.

There may be a plurality of substitute camera candidates that can shoot the target area. In the example shown in FIG. 4, there are three substitute camera candidates 500-1, 500-2, and 500-3. The abnormality handling unit 20 acquires a plurality of substitute video candidates SIMG-i respectively shot with (taken by) the plurality of substitute camera candidates 500-i (i=1 to 3). Then, the abnormality handling unit 20 selects (adopts) at least one of the plurality of substitute video candidates SIMG-i as the substitute video SIMG.

For example, the abnormality handling unit 20 considers a resolution or a frame rate of each of the plurality of substitute video candidates SIMG-i. Then, the abnormality handling unit 20 selects at least one of the plurality of the substitute video candidates SIMG-i with a highest resolution or a highest frame rate as the substitute video SIMG.

As another example, the abnormality handling unit 20 may select a substitute video candidate SIMG-i currently showing the target vehicle 100T, that is the target of the remote support, as the substitute video SIMG. More specifically, the abnormality handling unit 20 acquires camera information CAM regarding each of the plurality of substitute camera candidates 500-i. The camera information CAM indicates a position, an orientation, a viewing angle, etc. of the substitute camera candidate 500-i. For example, when the substitute camera candidate 500-i is an infrastructure camera 400, the camera information CAM indicates an installation position, an installation orientation, a viewing angle, etc. of the infrastructure camera 400. Typically, the installation position of the infrastructure camera 400 is represented by latitude and longitude in an absolute coordinate system. The camera information CAM about the infrastructure camera 400 is provided from the infrastructure camera 400 or the management device 300. As another example, when the substitute camera candidate 500 is a camera mounted on the moving body, the camera information CAM indicates an installation position, an installation orientation, a viewing angle, etc. of the camera on the moving body in addition to a position and an azimuth of the moving body. The position of the moving body is represented by latitude and longitude in the absolute coordinate system. The camera information CAM about the camera mounted on the moving body is provided from the moving body. Further, the abnormality handling unit 20 acquires position information of the target vehicle 100T from the target vehicle 100T. The position information of the target vehicle 100T is included in the vehicle information VCL transmitted from the target vehicle 100T. The abnormality handling unit 20 can select a substitute camera candidate 500-i that captures the target vehicle 100T in the visual field based on the camera information CAM and the position information of the target vehicle 100T. Then, the abnormality handling unit 20 selects the substitute video candidate SIMG-i shot with the selected substitute camera candidate 500-i as the substitute video SIMG.

As described above, the abnormality handling unit 20 may perform the abnormality handling process according to the type of abnormality in the first video IMG-1. For example, in the case of the first abnormality caused by the deterioration of the communication quality in the communication path of the first video IMG-1, the abnormality handling unit 20 performs the substitute video presenting process. As another example, in the case of the second abnormality caused by the congestion control on the transmission side, the abnormality handling unit 20 may perform the substitute video presenting process. As still another example, when the first infrastructure camera 400-1 fails, the abnormality handling unit 20 may perform the substitute video presenting process.

As described above, in the substitute video presenting process, the substitute video SIMG that is used instead of the first video IMG-1 in which the abnormality has occurred is presented to the remote supporter X. The remote supporter X is able to continue the remote support by referring to the substitute video SIMG with no abnormality instead of the first video IMG-1 in which the abnormality occurs. This ensures the accuracy of the remote support.

2-2-2. Video Recovery Process

Figure 5:
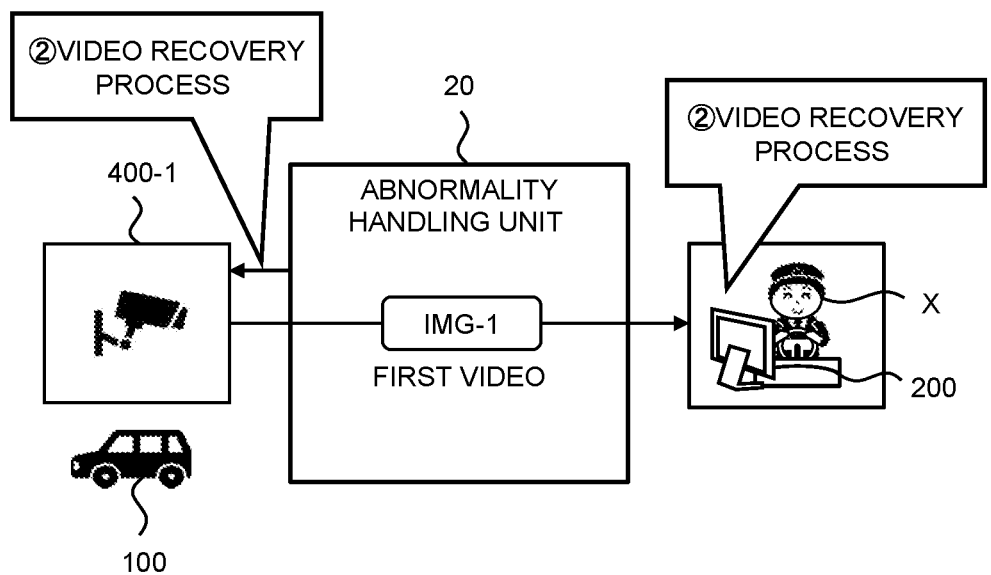
FIG. 5 is a conceptual diagram for explaining processing related to a video recovery process according to the embodiment.

FIG. 5 is a conceptual diagram for explaining processing related to the video recovery process. As described above, the quality (visibility) of the first video IMG-1 presented to the remote supporter X is deteriorated due to the third abnormality caused by the photographing condition of the first video IMG-1. For example, in a backlight environment or the like, so-called "blown out highlights" or "blocked up shadows" may occur in the first video IMG-1. As another example, the first video IMG-1 may be too dark in a dark environment. The video recovery process may be preferably applied to the case of such the third abnormality and solves the abnormality of the first video IMG-1 by recovering the quality (visibility) of the first video IMG-1.

For example, the abnormality handling unit 20 acquires the first video IMG-1 and automatically determines the environment (scene) under which the first video IMG-1 is shot. As a technique for determining the photographing condition based on the video (image), the technique described in the above-mentioned Non-Patent Literature 1 is exemplified. When it is determined that the first video IMG-1 is shot under the backlight environment or the dark environment, the abnormality handling unit 20 performs a brightness correction process by software so that the visibility of the first video IMG-1 is improved. The brightness correction process corrects the first video IMG-1 shot in a scene such as nighttime or backlight so as to have appropriate brightness, thereby improving the visibility. This brightness correction process is, for example, realized by the technique described in the above-mentioned Non-Patent Literature 2.

As another example, the abnormality handling unit 20 may adjust a parameter (e.g., a diaphragm) of the first infrastructure camera 400-1 so that the visibility of the first video IMG-1 is improved. In this case, the abnormality handling unit 20 communicates with the first infrastructure camera 400-1 and instructs the first infrastructure camera 400-1 to adjust the parameter (e.g., a diaphragm).

As described above, the video recovery process corrects the first video IMG-1 by software or adjusts the parameter of the first infrastructure camera 400-1 so that the visibility of the first video IMG-1 is improved. The remote supporter X is able to continue the remote support by referring to the first video IMG-1 with the improved visibility. This ensures the accuracy of the remote support.

2-2-3. Camera Recovery Processing

Figure 6:
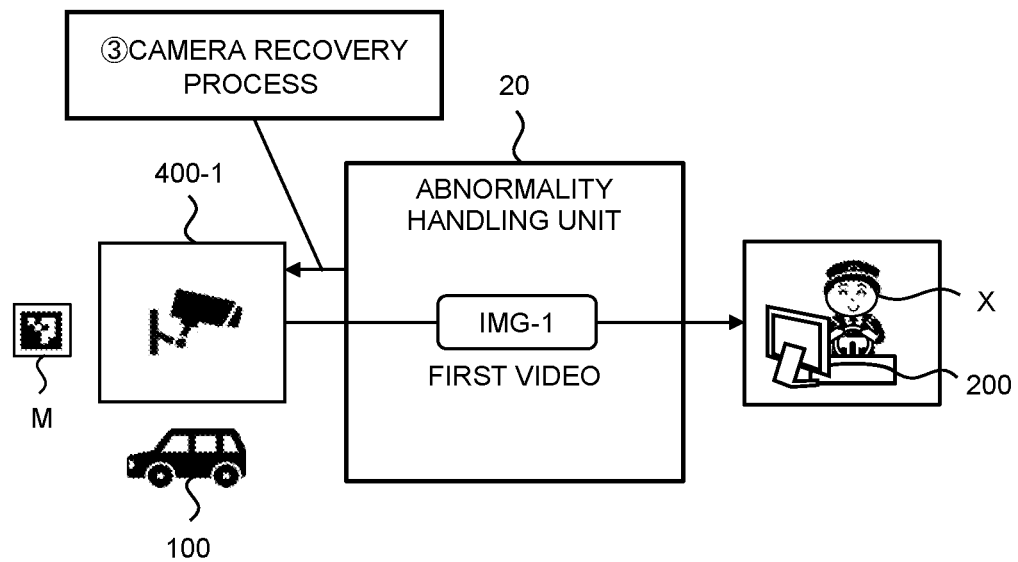
FIG. 6 is a conceptual diagram for explaining processing related to a camera recovery process according to the embodiment.

FIG. 6 is a conceptual diagram for explaining processing related to the camera recovery process. As described above, when the axial deviation of the first infrastructure camera 400-1 occurs and the visual field is changed, the target vehicle 100T may not be properly included in the visual field. The camera recovery process may be preferably applied to the case of such an axial deviation and solves the abnormality of the first video IMG-1 by solving the axial deviation of the first infrastructure camera 400-1.

More specifically, the abnormality handling unit 20 instructs the first infrastructure camera 400-1 to perform calibration. For example, a predetermined marker M is installed at a predetermined position in the visual field of the first infrastructure camera 400-1. The first infrastructure camera 400-1 recognizes the predetermined marker M and performs calibration so that the axial deviation is resolved based on the result of the recognition.

As described above, the camera recovery process resolves the abnormality of the first video IMG-1 by resolving the axial deviation of the first infrastructure camera 400-1. The remote supporter X is able to continue the remote support by referring to the first video IMG-1 whose abnormality is resolved. This ensures the accuracy of the remote support.

2-3. Abnormality Determination Unit and Abnormality Handling Unit

The locations of the abnormality determination unit 10 and the abnormality handling unit 20 are not limited in particular as long as necessary information, e.g., the first video IMG-1, can be acquired. As described above, the vehicle 100, the remote support terminal 200, and the management device 300 can communicate with each other via the communication network. That is, a variety of information can be shared by the vehicle 100, the remote support terminal 200, and the management device 300. Therefore, the abnormality determination unit 10 and the abnormality handling unit 20 may be included in any of the vehicle 100, the remote support terminal 200, and the management device 300. The abnormality determination unit 10 and the abnormality handling unit 20 may be distributed to two or more of the vehicles 100, the remote support terminal 200, and the management device 300. For example, the abnormality determination unit 10 may be included in the management device 300, and the abnormality handling unit 20 may be included in the remote support terminal 200.

When generalizing, the abnormality determination unit 10 and the abnormality handling unit 20 are realized by one or more processors (processing circuitry) and one or more memory devices. The one or more processors execute a variety of information processing. The one or more memory devices store a variety of information necessary for processing by the one or more processors.

Figure 7:
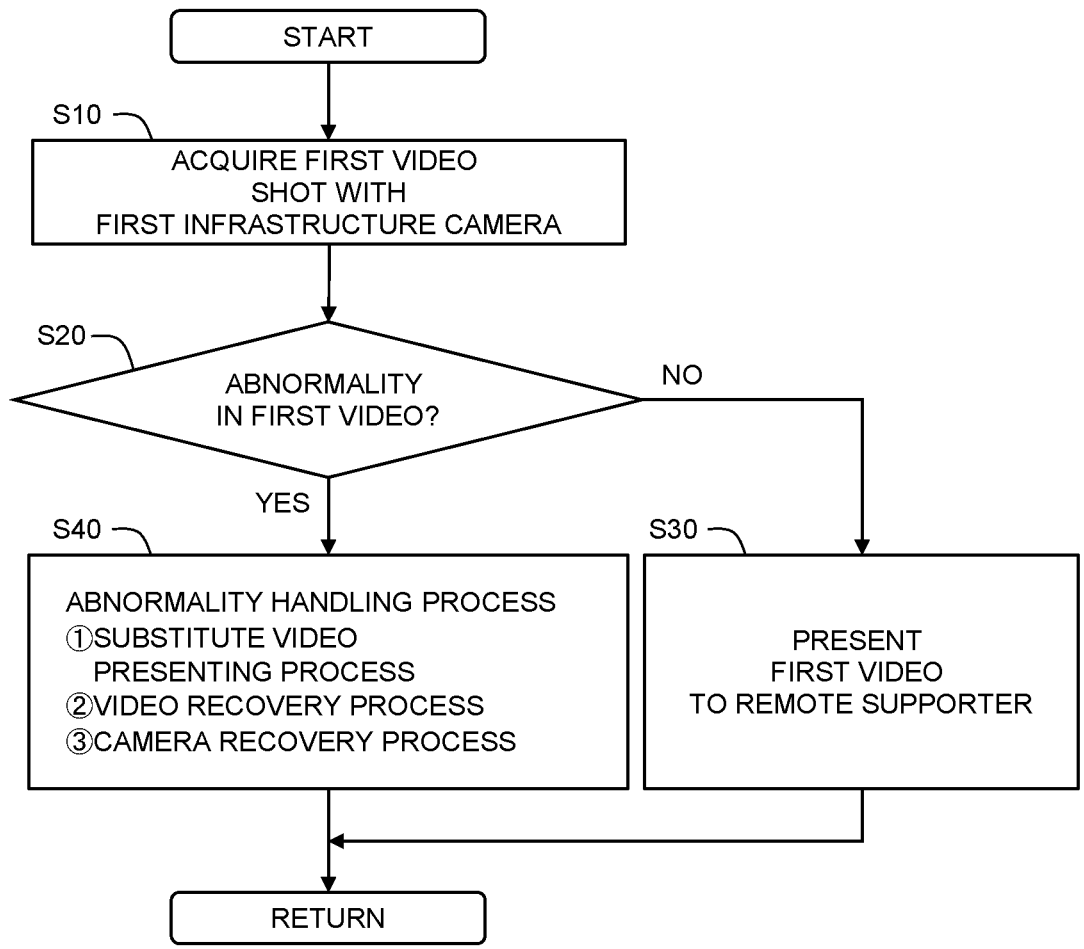
FIG. 7 is a flowchart summarizing processes related to the abnormality determination process and the abnormality handling process in the remote support system according to the embodiment.

FIG. 7 is a flowchart showing the processing related to the abnormality determination process and the abnormality handling process in the remote support system 1. In Step S10, the one or more processors acquire the first video IMG-1 shot with (taken by) the first infrastructure camera 400-1. The first video IMG-1 may be presented to the remote supporter X. In Step S20, the one or more processors execute the abnormality determination process for determining whether an abnormality has occurred in the first video IMG-1 (see the section 2-1). In a case where the abnormality does not occur in the first video IMG-1 (Step S20; No), the process proceeds to Step S30. In Step S30, the one or more processors present the first video IMG-1 to the remote supporter X. On the other hand, in a case where the abnormality occurs in the first video IMG-1 (Step S20; Yes), the process proceeds to Step S40. In Step S40, the one or more processors execute the abnormality handling process (see the section 2-2). The one or more processors may perform the abnormality handling process according to the type of abnormality in the first video IMG-1.

Note that the target vehicle 100T is not necessarily shown in the first video IMG-1 at the abnormality determination process or the abnormality handling process. This is because, if there is a possibility that the target vehicle 100T will be shown in the first video IMG-1 or the substitute video SIMG in the future, it is meaningful to perform the abnormality handling process in advance.

2-4. Effects

As described above, according to the present embodiment, the first video IMG-1 shot with the first infrastructure camera 400-1 is presented to the remote supporter X. When an abnormality occurs in the first video IMG-1, the abnormality handling process is executed. In the abnormality handling process, the abnormality of the first video IMG-1 is resolved, or the substitute video SIMG is presented to the remote supporter X instead of the first video IMG-1. The remote supporter X can continue the remote support by referring to the first video IMG-1 whose abnormality is resolved or the substitute video SIMG. This ensures the accuracy of the remote support. Further, convenience for the remote supporter X is also secured.

3. Example of Vehicle 3-1. Configuration Example

Figure 8:
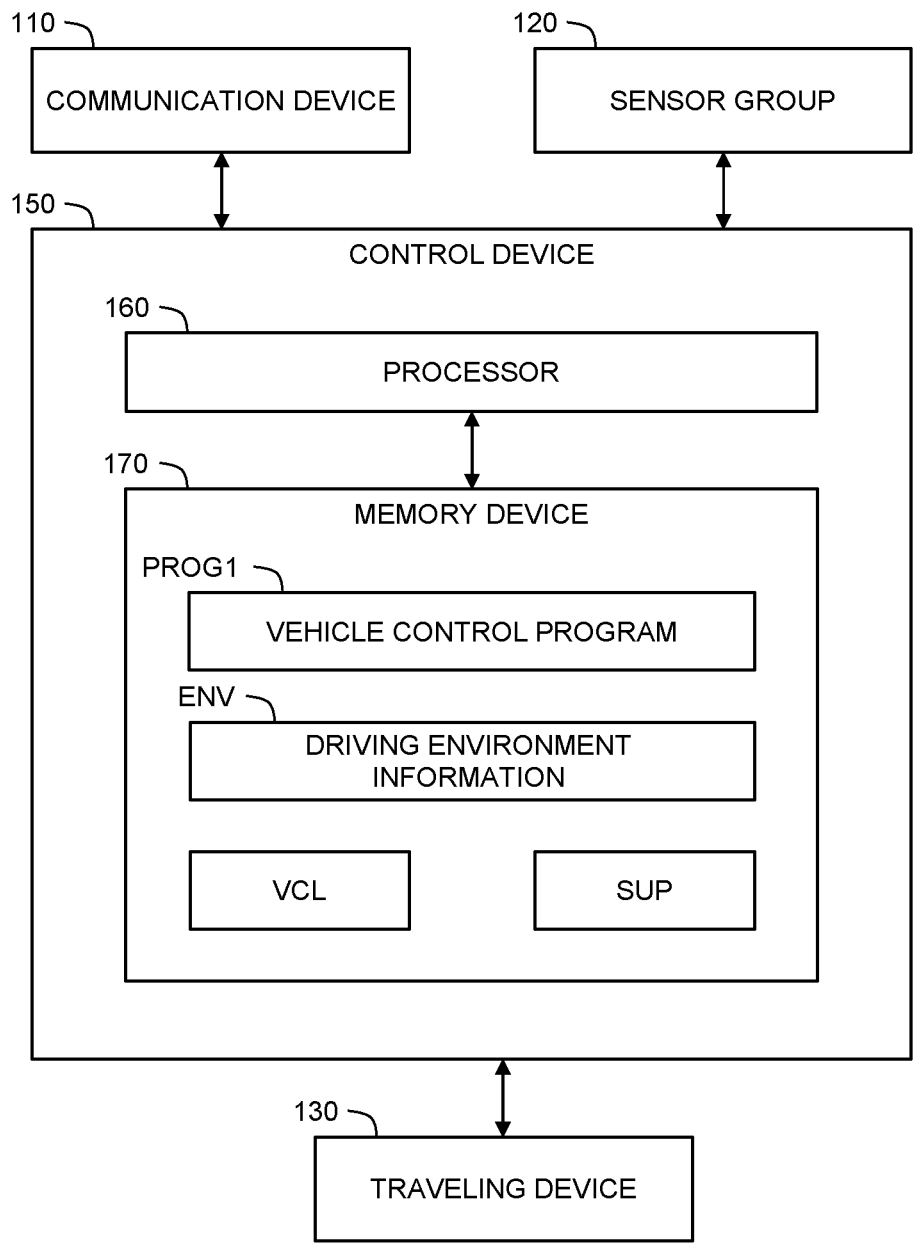
FIG. 8 is a block diagram showing a configuration example of a vehicle according to the embodiment.

FIG. 8 is a block diagram showing an example of a configuration of the vehicle 100. The vehicle 100 includes a communication device 110, a sensor group 120, a traveling device 130, and a control device 150.

The communication device 110 communicates with the outside of the vehicle 100. For example, the communication device 110 communicates with the remote support terminal 200 and the management device 300.

The sensor group 120 includes a recognition sensor, a vehicle condition sensor, a position sensor, etc. The recognition sensor recognizes (detects) a situation around the vehicle 100. Examples of the recognition sensor include the in-vehicle camera C, a laser imaging detection and ranging (LIDAR), a radar, etc. The vehicle condition sensor detects a condition of the vehicle 100. The vehicle condition sensor includes a speed sensor, an acceleration sensor, a yaw rate sensor, a steering angle sensor, etc. The position sensor detects a position and an orientation of the vehicle 100. For example, the position sensor includes a global navigation satellite system (GNSS).

The traveling device 130 includes a steering device, a driving device, and a braking device. The steering device steers a wheel. For example, the steering device includes an electric power steering (EPS) device. The driving device is a power source that generates a driving force. Examples of the driving device include an engine, an electric motor, and an in-wheel motor. The braking device generates a braking force.

The control device 150 is a computer that controls the vehicle 100. The control device 150 includes one or more processors 160 (hereinafter, simply referred to as a processor 160 or processing circuitry) and one or more memory devices 170 (hereinafter, simply referred to as a memory device 170). The processor 160 executes a variety of processing. For example, the processor 160 includes a central processing unit (CPU). The memory device 170 stores a variety of information necessary for the processing by the processor 160. Examples of the memory device 170 include a volatile memory, a non-volatile memory, a hard disk drive (HDD), and a solid state drive (SSD). The control device 150 may include one or a plurality of electronic control units (ECUs).

A vehicle control program PROG1 is a computer program executed by the processor 160. The processor 160 executes the vehicle control program PROG1, thereby realizing the functions of the control device 150. The vehicle control program PROG1 is stored in the memory device 170. Alternatively, the vehicle control program PROG1 may be recorded on a non-transitory computer-readable recording medium.

3-2. Driving Environment Information

The control device 150 uses the sensor group 120 to acquire driving environment information ENV indicating a driving environment for the vehicle 100. The driving environment information ENV is stored in the memory device 170.

The driving environment information ENV includes surrounding situation information indicating a result of recognition by the recognition sensor. For example, the surrounding situation information may include a video shot with the in-vehicle camera C. The surrounding situation information may include object information about objects around the vehicle 100. Examples of the object around the vehicle 100 include a pedestrian, another vehicle (a preceding vehicle, a parked vehicle, etc.), a white line, a traffic light, a sign, a roadside structure, etc. The object information indicates a relative position and a relative velocity of the object with respect to the vehicle 100.

The driving environment information ENV includes vehicle condition information indicating a vehicle condition detected by the vehicle condition sensor.

Further, the driving environment information ENV includes position information indicating the position and orientation of the vehicle 100. The position information is obtained by the position sensor. Highly accurate position information may be acquired by localization process utilizing map information and the surrounding situation information (object information).

3-3. Vehicle Travel Control

The control device 150 executes vehicle travel control for controlling the travel of the vehicle 100. The vehicle travel control includes steering control, drive control, and braking control. The control device 150 executes the vehicle travel control by controlling the travel device 130 (the steering device, the drive device, and the braking device).

The control device 150 may perform autonomous driving control based on the driving environment information ENV. More specifically, the control device 150 generates a travel plan of the vehicle 100 based on the driving environment information ENV. Further, the control device 150 generates a target trajectory necessary for the vehicle 100 to travel in accordance with the travel plan, based on the driving environment information ENV. The target trajectory includes a target position and a target velocity. Then, the control device 150 performs the vehicle travel control so that the vehicle 100 follows the target trajectory.

3-4. Process Related to Remote Support

Hereinafter, a case where the remote support of the vehicle 100 is performed will be described. The control device 150 communicates with the remote support terminal 200 via the communication device 110.

The control device 150 transmits the vehicle information VCL to the remote support terminal 200. The vehicle information VCL is information necessary for the remote support by the remote supporter X and includes at least a part of the driving environment information ENV described above. For example, the vehicle information VCL includes the surrounding situation information (particularly, the video). The vehicle information VCL may include the vehicle condition information and the vehicle position information.

The control device 150 receives the remote support information SUP from the remote support terminal 200. The remote support information SUP is information related to the remote support by the remote supporter X. For example, the remote support information SUP includes an operation amount input by the remote supporter X. The control device 150 performs the vehicle travel control in accordance with the remote support information SUP.

4. Example of Remote Support Terminal

Figure 9:
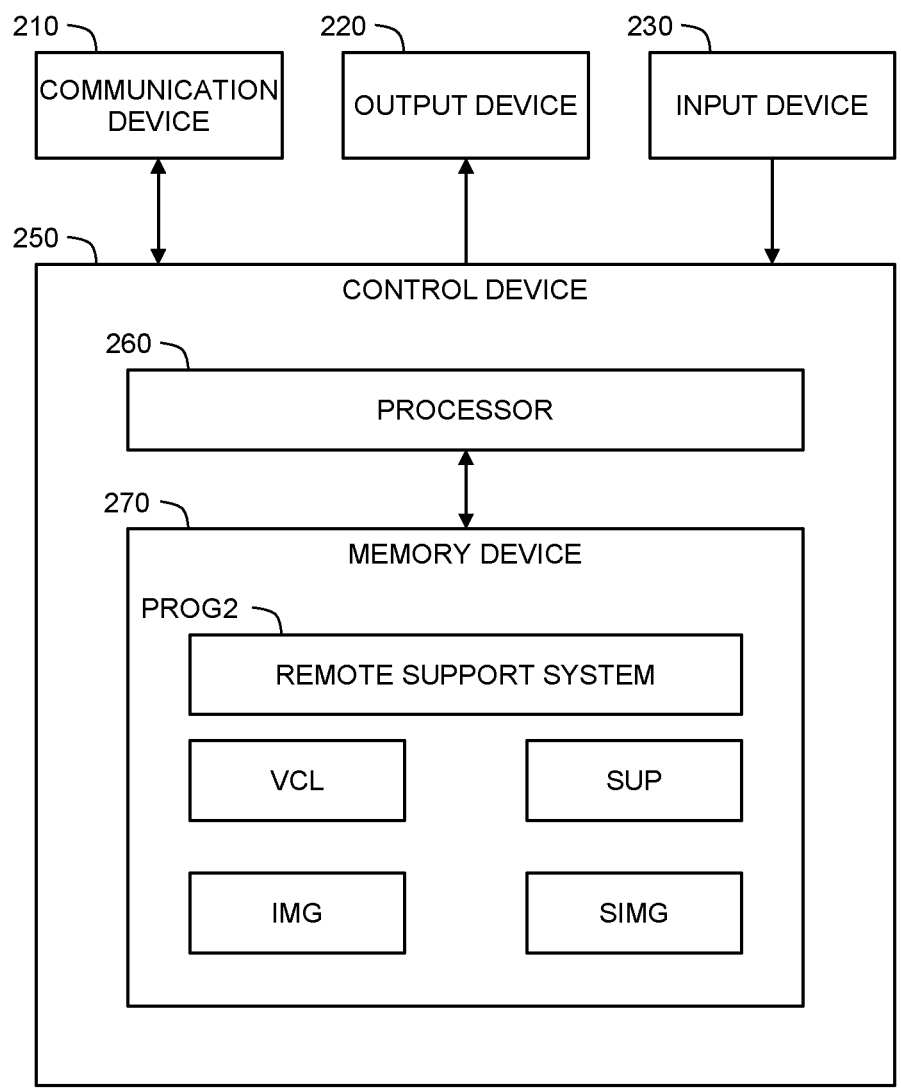
FIG. 9 is a block diagram showing a configuration example of a remote support terminal according to the embodiment.

FIG. 9 is a block diagram showing an example of the configuration of the remote support terminal 200. The remote support terminal 200 includes a communication device 210, an output device 220, an input device 230, and a control device 250.

The communication device 210 communicates with the vehicle 100 and the management device 300.

The output device 220 outputs a variety of information. For example, the output device 220 includes a display device. The display device presents a variety of information to the remote supporter X by displaying the variety of information. As another example, the output device 220 may include a speaker.

The input device 230 receives an input from the remote supporter X. Examples of the input device 230 include a touch panel, a button, a remote operation member, and the like. The remote operation member is a member operated when the remote supporter X remotely operates the vehicle 100. For example, the remote operation member includes a steering wheel, an accelerator pedal, a brake pedal, a direction indicator, etc. The remote operation member may be a touch panel.

The control device 250 controls the remote support terminal 200. The control device 250 includes one or more processors 260 (hereinafter, simply referred to as a processor 260 or processing circuitry) and one or more memory devices 270 (hereinafter, simply referred to as a memory device 270). The processor 260 executes a variety of processing. For example, the processor 260 includes a CPU. The memory device 270 stores a variety of information necessary for the processing by the processor 260. Examples of the memory device 270 include a volatile memory, a non-volatile memory, an HDD, and an SSD.

A remote support program PROG2 is a computer program executed by the processor 260. The processor 260 executes the remote support program PROG2, thereby realizing the functions of the control device 250. The remote support program PROG2 is stored in the memory device 270. Alternatively, the remote support program PROG2 may be recorded on a non-transitory computer-readable recording medium. The remote support program PROG2 may be provided via a network.

The control device 250 communicates with the vehicle 100 via the communication device 210. The control device 250 receives the vehicle information VCL transmitted from the vehicle 100. The control device 250 presents the vehicle information VCL to the remote supporter X by displaying the vehicle information VCL including the video on the display device. The remote supporter X can recognize the condition of the vehicle 100 and the surrounding situation based on the vehicle information VCL displayed on the display device.

The remote supporter X operates the input device 230 to perform the remote support of the vehicle 100 as necessary. For example, the remote supporter X issues various instructions (for example, a start instruction) via the input device 230. When the remote driving of the vehicle 100 is performed, the remote supporter X operates the remote driving member. The operation amount of the remote operation member is detected by a sensor installed in the remote operation member. The control device 250 generates the remote support information SUP including an instruction or an operation amount input by the remote supporter X. Then, the control device 250 transmits the remote support information SUP to the vehicle 100 via the communication device 210.

The control device 250 acquires the video IMG shot with the infrastructure camera 400 via the management device 300. The acquired video IMG is stored in the memory device 270. The control device 250 presents the video IMG to the remote supporter X via the output device 220. More specifically, the control device 250 displays the video IMG on the display device.

Further, the control device 250 may include the functions of the abnormality determination unit 10 and the abnormality handling unit 20 described above. The control device 250 acquires the first video IMG-1 shot with the first infrastructure camera 400-1. The control device 250 acquires the substitute video SIMG shot with the substitute camera 500. The substitute video SIMG is stored in the memory device 270. In addition, the control device 250 may acquire information necessary for processing, such as the camera information CAM. The control device 250 executes the abnormality determination process and the abnormality handling process based on the acquired information (see the section 2). The control device 250 may display the substitute video SIMG on the display device.

5. Example of Management Device

Figure 10:
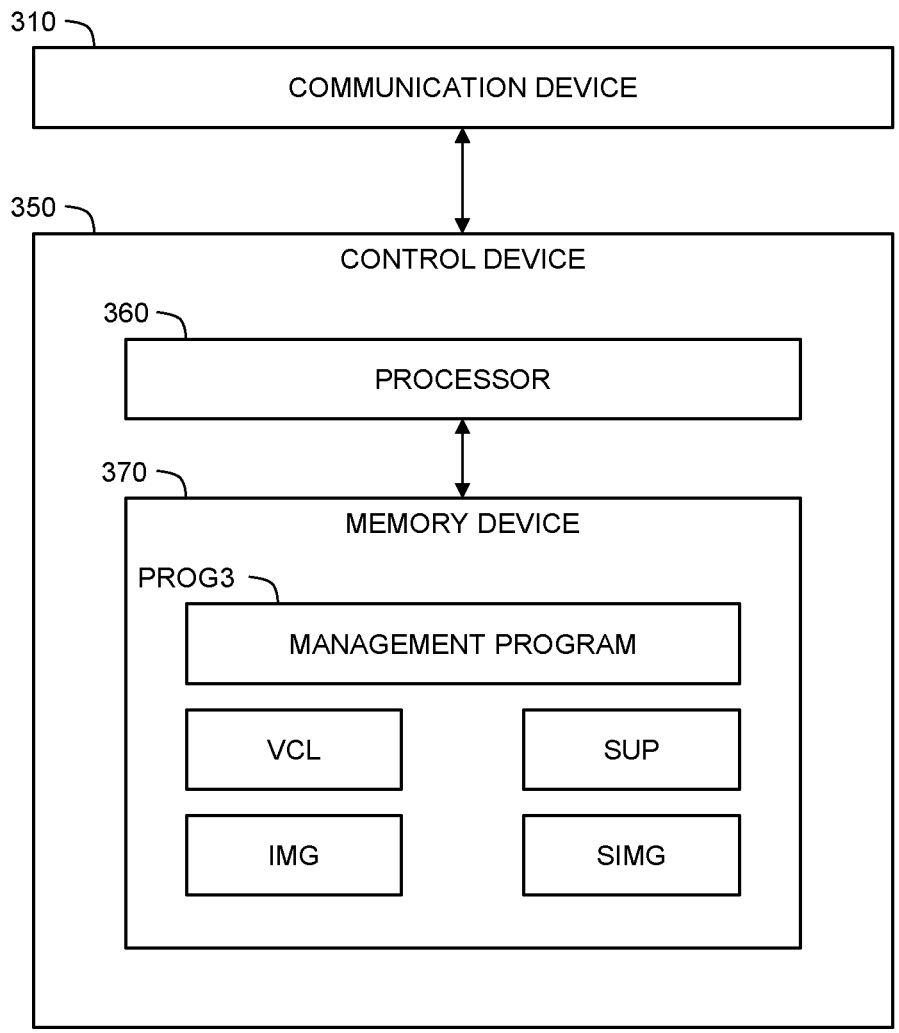
FIG. 10 is a block diagram showing a configuration example of a management device according to the embodiment.

FIG. 10 is a block diagram showing an example of the configuration of the management device 300. The management device 300 includes a communication device 310 and a control device 350.

The communication device 310 communicates with the vehicle 100, the remote support terminal 200, and the infrastructure camera 400.

The control device 350 controls the management device 300. The control device 350 includes one or more processors 360 (hereinafter, simply referred to as a processor 360 or processing circuitry) and one or more memory devices 370 (hereinafter, simply referred to as a memory device 370). The processor 360 executes a variety of processing. For example, the processor 360 includes a CPU. The memory device 370 stores a variety of information necessary for the processing by the processor 360. Examples of the memory device 370 include a volatile memory, a non-volatile memory, an HDD, and an SSD.

The management program PROG3 is a computer program executed by the processor 360. The processor 360 executes the management program PROG3, thereby realizing the functions of the control device 350. The management program PROG3 is stored in the memory device 370. Alternatively, the management program PROG3 may be recorded on a non-transitory computer-readable recording medium. The management program PROG3 may be provided via a network.

The control device 350 communicates with the vehicle 100 and the remote support terminal 200 via the communication device 310. The control device 350 receives the vehicle information VCL transmitted from the vehicle 100. Then, the control device 350 transmits the vehicle information VCL to the remote support terminal 200. The control device 350 receives the remote support information SUP transmitted from the remote support terminal 200. Then, the control device 350 transmits the received remote support information SUP to the vehicle 100.

The control device 350 communicates with the infrastructure camera 400 via the communication device 310 and acquires the video IMG shot with the infrastructure camera 400. The control device 350 provides the video IMG to the remote support terminal 200. The control device 350 may acquire the camera information CAM and provide the camera information CAM to the remote support terminal 200.

Further, the control device 350 may have the functions of the abnormality determination unit 10 and the abnormality handling unit 20 described above. The control device 350 acquires the first video IMG-1 shot with the first infrastructure camera 400-1. The control device 350 acquires the substitute video SIMG shot with the substitute camera 500. The substitute video SIMG is stored in the memory device 370. The control device 350 executes the abnormality determination process and the abnormality handling process based on the acquired information (see the section 2). The control device 350 may transmit the substitute video SIMG to the remote support terminal 200.

What is claimed is:

1. A remote support system for providing a remote support for a moving body, comprising
   processing circuitry configured to:
   acquire, via communication, a first video shot with a first infrastructure camera installed in a target area where the moving body moves;
   present the first video to a remote supporter to perform the remote support for the moving body; and
   when an abnormality in the first video occurs, execute an abnormality handling process to resolve the abnormality in the first video or to present a substitute video to the remote supporter instead of the first video.

2. The remote support system according to claim 1, wherein
   the abnormality handling process includes:
   acquiring the substitute video shot with a substitute camera shooting the target area; and
   presenting the substitute video to the remote supporter instead of the first video.

3. The remote support system according to claim 1, wherein
   the abnormality in the first video is any of:
   a first abnormality caused by a decrease in communication quality in a communication path of the first video;
   a second abnormality caused by congestion control on a transmission side of the first video;
   a third abnormality caused by a photographing condition of the first video; and
   a fourth abnormality caused by an abnormality of the first infrastructure camera, and
   the processing circuitry is configured to perform the abnormality handling process in accordance with a type of the abnormality in the first video.

4. The remote support system according to claim 3, wherein
   the abnormality handling process in a case of the first abnormality or the second abnormality is a substitute video presenting process, and
   the substitute video presenting process includes:
   acquiring the substitute video shot with a substitute camera shooting the target area; and
   presenting the substitute video to the remote supporter instead of the first video.

5. The remote support system according to claim 3, wherein
   the fourth abnormality includes a failure of the first infrastructure camera,
   the abnormality handling process in a case of the failure of the first infrastructure camera is a substitute video presenting process, and
   the substitute video presenting process includes:
   acquiring the substitute video shot with a substitute camera shooting the target area; and
   presenting the substitute video to the remote supporter instead of the first video.

6. The remote support system according to claim 4, wherein
   when there is a plurality of substitute camera candidates shooting the target area, the substitute video presenting process includes:
   acquiring a plurality of substitute video candidates respectively shot with the plurality of substitute camera candidates; and
   selecting at least one of the plurality of substitute video candidates as the substitute video.

7. The remote support system according to claim 6, wherein
   one of the plurality of substitute video candidates with a highest resolution or a highest frame rate is at least selected as the substitute video.

8. The remote support system according to claim 4, wherein
   the substitute camera is another infrastructure camera different from the first infrastructure camera or a camera mounted on another moving body different from the moving body.

9. The remote support system according to claim 3, wherein
   the abnormality handling process in a case of the third abnormality is a video recovery process, and
   the video recovery process includes adjusting a parameter of the first infrastructure camera or correcting the first video by software so that visibility of the first video is improved.

10. The remote support system according to claim 3, wherein
    the fourth abnormality includes an axial deviation of the first infrastructure camera,
    the abnormality handling process in a case of the axial deviation of the first infrastructure camera is a camera recovery process, and
    the camera recovery process includes calibrating the first infrastructure camera with a marker placed within a visual field of the first infrastructure camera.

11. A remote support method executed by a computer and for providing a remote support for a moving body,
    the remote support method comprising:
    acquiring, via communication, a first video shot with a first infrastructure camera installed in a target area where the moving body moves;
    presenting the first video to a remote supporter to perform the remote support for the moving body; and when an abnormality in the first video occurs, executing an abnormality handling process to resolve the abnormality in the first video or to present a substitute video to the remote supporter instead of the first video.

* * * * *